(12) United States Patent
Kim et al.

(10) Patent No.: US 8,009,664 B2
(45) Date of Patent: Aug. 30, 2011

(54) METHOD FOR EXCHANGING MEDIA DESCRIPTION INFORMATION BETWEEN USER AGENTS USING SESSION INITIATION PROTOCOL

(75) Inventors: Taek-Ho Kim, Suwon-si (KR); Myeon-Kee Youn, Incheon-si (KR); Seong-Joon Jeon, Yongin-si (KR); Jin-Suk Lee, Seoul (KR); Kwang-Yong Choi, Suwon-si (KR); Jae-Kil Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1649 days.

(21) Appl. No.: 11/315,185

(22) Filed: Dec. 23, 2005

(65) Prior Publication Data

US 2006/0159072 A1 Jul. 20, 2006

(30) Foreign Application Priority Data

Jan. 19, 2005 (KR) .................. 10-2005-0005143

(51) Int. Cl.
*H04L 12/66* (2006.01)
*H04M 3/42* (2006.01)
*G06F 15/16* (2006.01)

(52) U.S. Cl. ........ 370/352; 370/353; 370/354; 370/355; 370/356; 455/414.1; 455/414.2; 709/204; 709/205; 709/206; 709/207; 709/227; 709/228; 709/229; 709/230; 709/231; 709/237

(58) Field of Classification Search .......... 370/352–356; 455/414.1, 414.2; 709/204–207, 227–231, 709/237

See application file for complete search history.

(56) References Cited

U.S. PATENT DOCUMENTS

| | | | |
|---|---|---|---|
| 2003/0061427 A1* | 3/2003 | O'Donnell | 710/300 |
| 2003/0167354 A1* | 9/2003 | Peppers et al. | 709/327 |
| 2004/0057422 A1* | 3/2004 | Burritt et al. | 370/352 |
| 2004/0095958 A1* | 5/2004 | Ejzak et al. | 370/465 |
| 2004/0139198 A1* | 7/2004 | Costa-Requena et al. | 709/227 |
| 2004/0185774 A1* | 9/2004 | Scott | 455/11.1 |
| 2004/0240399 A1* | 12/2004 | Corrao et al. | 370/260 |

(Continued)

OTHER PUBLICATIONS

Korean Office Action of the Korean Patent Application No. 2005-5143, issued on Jul. 21, 2006.

(Continued)

*Primary Examiner* — Joe H Cheng
*Assistant Examiner* — Kai J Chang
(74) *Attorney, Agent, or Firm* — H.C. Park & Associated, PLC (57) ABSTRACT

A method for exchanging media description information between user agents using a session initiation protocol (SIP) comprises the steps of: providing information on an OS and sound module of a first user agent so that the first user agent generates, in a media description field of a session description protocol (SDP), an SIP message including the information on the OS and sound module of the first user agent, and sends it to a second user agent; and setting a processing format for voice data of the second user agent so that the second user agent determines the voice data format supportable by the first user agent from the information on the OS and sound module of the first user agent, compares it with the voice data format supportable by the second user agent, and sets a format commonly supportable by the first and second user agents as the voice data format of the second user agent.

22 Claims, 5 Drawing Sheets

U.S. PATENT DOCUMENTS

2005/0060411 A1* 3/2005 Coulombe et al. ............ 709/227
2005/0195860 A1* 9/2005 Ollis et al. .................... 370/487
2005/0238050 A1* 10/2005 Pung et al. .................... 370/469
2007/0153766 A1* 7/2007 Bienn et al. ................... 370/352

OTHER PUBLICATIONS

An article "SDP: Session Description Protocol" written by Handley et al., published in Standards Track, pp. 1-42 in Apr. 1998.

* cited by examiner

METHOD FOR EXCHANGING MEDIA DESCRIPTION INFORMATION BETWEEN USER AGENTS USING SESSION INITIATION PROTOCOL

CLAIM OF PRIORITY

This application makes reference to, incorporates the same herein, and claims all benefits accruing under 35 U.S.C. §119 from an application for METHOD FOR EXCHANGING MEDIA DESCRIPTION INFORMATION BETWEEN USER AGENTS USING SESSION INITIATION PROTOCOL earlier filed in the Korean Intellectual Property Office on Jan. 19, 2005 and there duly assigned Serial No. 2005-5143.

BACKGROUND OF THE INVENTION

1. Technical Field

The present invention relates to a method for exchanging media description information between user agents using a session initiation protocol (SIP) and, more particularly, to a method for exchanging media description information between the user agents using an SIP, which enables an operating system (OS) and a kind of sound module that the user agent uses to be indicated in an additional information field of a session description protocol (SDP) including information on the session, so that voice communication between the user agents using different sound modules can be smoothly conducted.

2. Related Art

It has been well known that SIP is a signal protocol establishing and releasing a session in a single network that is a standard for VoIP phones for locating and connecting user agents in a multipoint audio-graphic conference. As is the case with hypertext transfer protocol (HTTP), SIP is a versatile and convenient protocol. SIP supports both collaboration multimedia conference and voice service electronic commerce. An Internet engineering task force (IETF) announced RFC 2543 as the first version of SIP, and most recently made RFC 3261 public in June 2002.

SIP is an ideal protocol for VoIP in which traditional end-to-end voice lines in a legacy network can be replaced with a session on the Internet. Such a function exists not only in the ITU H.323 multimedia standard, but also in the private VoIP phones of some companies. Some companies who had manufactured products before the entrance of SIP had adopted H.323. However, SIP is a protocol which is transferable more simply, and which is smaller and lighter in its overhead, than H.323.

Since SIP renders existing telephone connections closer to a standard, it is easier to conduct advanced service, such as a presence. This makes it possible to immediately check whether users can receive a call from a video or instant messaging session as well as a specific telephone, and users want to receive the call. Also, it can forward a call to multiple destinations in VoIP calling.

Although SIP can use transmission control protocol (TCP), in addition to a user datagram protocol (UDP), as a transmission means, SIP uses UDP at port 5060 as a default value. If an SIP packet is lost by an unreliable protocol such as UDP, SIP firstly determines whether to wait for a sufficient time, and then retransmits an instruction. 'INVITE' is the most general instruction that SIP sends to another end point. An SIP phone sends the 'INVITE' instruction when a user agent tries to connect with another SIP phone or user agent. If the invitation is accepted, a response of '200' is returned to the originator who generated and sent the invitation message, which means everything is all right and a session has been established.

With the request for 'INVITE', SDP informs the user agent of the caller's media capabilities. If a called group answers, an 'OK' message is sent in reply, and this message includes the media capabilities supported.

Although some SIP phones can call each other directly, if an extension capability is required, a server is required. An SIP server continuously traces directory information and the location of a called group. There are several SIP servers, each of which can be operated as the same server or on its own hardware platform.

The SIP servers include a proxy server for generating a request and establishing a connection as a substitute for the user agent, a redirect server for providing the user agent with replaced location information in response to the request but not participating in the connecting creation, a registration server for use in a present location registration by means of SIP equipment such as telephones, and a location server for storing location information in a database and resident in a physical server, such as a general registration server.

The SIP proxy server processes the request of SIP phones or a user agent. The proxy server initiates the connection with regard to a recipient instead of an originator, and is resident in a loop until a response of '200' (an 'OK' message) is received. Since the proxy server has its IP address in a 'Via' field, a destination client can know where the response should be sent. The proxy server then sends the response to the originator in turn. An address of a 'Contact' field is used for direct communication between user agents.

If the proxy server transmits an 'INVITE' request, it immediately sends back a status message of '100' or 'trying'. This is a message informing the originator of the operation that the 'INVITE' request has been sent. The proxy server determines the location of a destination user agent, sends the user agent an 'INVITE' message, and then sends the originator a '180' or 'ringing' message. The recipient sends the proxy server a '200' response while answering it, and the proxy server sends a message to the original user agent.

The originator who receives the '200' message sends the destination client an 'ACK' response so as to inform the client of the fact that the originator has received the '200' message. All communications thereafter are conducted between the clients, and a real-time transport protocol (RTP) takes responsibility for digitized audio transport between the user agents. Once the call is completed, a 'BYE' message is transported to another user agent, which in turn sends another '200' response.

Although, upon the completion of the call, the proxy server basically frees itself from the loop, it may be constructed so as to be in the periphery of the loop. The method thereof is that, when the proxy server communicates with the user agent, it inserts its own address in a 'Contact' field so as to enable the user agent to send back a response to the proxy server instead of the originating user agent. Maintaining the involvement of a proxy while calling makes it possible to render a detailed report at a point where a trace for calling time is possible. This also impedes, for the purpose of security, the details of the network end point.

The redirect server receives the request from the user agent or the proxy server. The redirect server cannot make a connection by itself, but merely responds with information as to where the original request should be retried. The method of using the redirect server may be one which is capable of giving the user agent required information quickly and without putting a heavy burden on the proxy server.

If the proxy server is in use, the register server is required. For example, when the telecommuter connects a VoIP phone, this equipment becomes an opposite party's location in the register server. As long as there is an SIP gateway which is usable upon connection of a call, many telephones can be registered in the register server.

Until now, the SIP has been seen schematically. The SIP does not transport digital speech, and the transportation thereof is under the RTP's charge. The RTP transports voice communication after the SIP establishes a call. If the SIP were able to establish voice, text messaging or video sessions using various codecs and technologies, it would first have to determine which function is supported by equipment in the sessions. In this case, the session description protocol (SDP) intervenes and the SIP negotiates the use of the SDP to provide conversation between two endpoints.

The SDP is used for recording additional information concerning the session in SIP, and aims at interworking with various transport protocols (service advertising protocol (SAP), SIP and real-time streaming protocol (RTSP)). SDP transports media stream information of the corresponding session in order to allow the recipient receiving the session description to participate in the session.

The SDP includes session name, session activation time, media constituting session, information receiving the media, bandwidth information used by conference, and contact information of a person in charge of the session.

The SDP body is composed of the three fields of session description, time description and media description, each of which is constructed as an item such as in Table 1, Table 2 and Table 3 below. Table 1 illustrates session description, Table 2 illustrates time description and Table 3 illustrates media description.

TABLE 1

| | Session Description |
|---|---|
| v | Protocol version |
| o | Owner/creator and session identifier |
| s | Session name |
| i | Session information |
| u | URI of description |
| e | Email address |
| p | Phone number |
| c | Correction information-not required if included in all media |
| b | Bandwidth information |
| z | Time zone adjustments |
| k | Encryption key |
| a | Zero or more session attribute lines |

TABLE 2

| | Time Description |
|---|---|
| t | Time the session is active |
| r | Zero or more repeat times |

TABLE 3

| | Media Description |
|---|---|
| m | Media name and transport address |
| i | Media title |
| c | Connection information-optional if included at session level |
| b | Bandwidth information |
| k | Encryption key |

TABLE 3-continued

| | Media Description |
|---|---|
| a | Zero or more media attribute lines |
| d | Detailed information |

SUMMARY OF THE INVENTION

It is, therefore, an object of the present invention to provide a method for exchanging media description information between user agents using a session initiation protocol (SIP), and allowing the processing of voice data in a new format upon establishment of voice communication between the user agents, through the addition of a new item to a media description field of a session description protocol (SDP).

To achieve the above and other objects, there is provided a method for exchanging media description information between user agents using a session initiation protocol (SIP), the method comprising the steps of: providing information on an OS and a sound module of a first user agent such that the first user agent generates, in a media description field of a session description protocol (SDP), an SIP message including the information of the OS and the sound module used by the first user agent, and transports it to a second user agent; and setting a processing format of voice data of the second user agent such that the second user agent checks the voice data format supportable by the first user agent from the provided information on the OS and the sound module of the first user agent, compares it with the voice data format supportable by the second user agent, and sets the format commonly supportable by the first and second user agents as the voice data format of the second user agent.

Preferably, the second step of setting the processing format of voice data of the second user agent includes the sub-steps of: when the second user agent is a recipient user agent, determining whether the media description field is involved in the SDP included in an INVITE message received from the first user agent; and when the SDP involves the media description field, determining the voice data format supportable by an originating user agent from the information on the OS and the sound module included in a media specification description item in the media description field, comparing the determined voice data format of the originating user agent with the voice data format supportable by the recipient user agent, and setting the format commonly supportable by both user agents as the processing format of voice data of the originating user agent and the recipient user agent.

Preferably, the second step of setting the processing format of voice data of the second user agent includes the sub-steps of: when the second user agent is an originating user agent, determining whether the media description field is included in an SDP included in a response message received from the first user agent; and when the SDP includes the media description field, determining the voice data format supportable by a recipient user agent from the information on the OS and the sound module included in a media specification description item in the media description field, comparing the determined voice data format of the recipient user agent with the voice data format supportable by the originating user agent, and setting the format commonly supportable by both user agents as the processing format of voice data of the originating user agent and recipient user agent.

Preferably, with respect to determining whether the SDP includes the media description field, if the media description field is not included, a default value is set as the processing format of voice data.

Preferably, the default value is G.711 A-law.

Preferably, the OS for the user agent includes at least one of Linux and Win CE.

Preferably, the sound module for the user agent includes at least one of maestro3, i810_audio, ali5455, and s3c24a0.

Preferably, the voice data format includes at least one of G.711 A-law/μ-law and signed 16 little endian (S16_LE).

In accordance with another embodiment of the present invention, there is provided a method for exchanging media information between user agents using a session initiation protocol (SIP), the method comprising the steps of: generating, at a first user agent, an SIP message including information on the OS and the sound module of the first user agent in a media specification description field of a session description protocol (SDP); and sending the generated SIP message to a second user agent communicating with the first user agent such that the first user agent provides the second user agent with the information on the OS and the sound module of the first user agent.

In accordance with still another embodiment of the present invention, there is provided a method for exchanging media information between user agents using a session initiation protocol (SIP), the method comprising the steps of: receiving, at a first user agent, a session description protocol (SDP) of a session initiation protocol (SIP) message transported by a second user agent; and determining a voice data format supportable by the second user agent from the information on the OS and the sound module of the second user agent contained in a media description field in the SDP, and setting the format commonly supportable by the first user agent and the second user agent as the processing format of voice data of the first user agent.

Preferably, the second step of determining the voice data format includes the sub-steps of: when the first user agent is a recipient user agent, determining whether the media description field is in the SDP included in an INVITE message received from the second user agent; and when the SDP includes the media description field, deriving the voice data format supportable by an originating user agent from the information on the OS and the sound module involved in a media specification description item in the media description field, and setting the format commonly supportable by both the first user agent and the second user agent as the processing format of voice data of the first user agent, and when the media description field is not included in the SDP, setting a default value as the processing format of voice data of the first user agent.

Preferably, the second step of determining the voice data format includes the sub-steps of: when the first user agent is an originating user agent, determining whether the media description field is included in the SDP included in a response message received from the second user agent; and, when the SDP includes the media description field, deriving the voice data format supportable by the originating user agent from the information on the OS and the sound module included in a media specification description item in the media description field, and setting the format commonly supportable by both the first user agent and the second user agent as the processing format of voice data of the first user agent, and when the media description field is not included in the SDP, setting a default value as the processing format of voice data of the first user agent.

In accordance with yet still another embodiment of the present invention, there is provided a method for exchanging media information between user agents using a session initiation protocol (SIP), the method comprising the steps of: generating an SIP message including information on the OS and the sound module that a first user agent uses in a media description field of a session description protocol (SDP), and sending the generated SIP message to a second user agent so as to exchange the information on the OS and the sound module between the user agents; determining whether the media description field is included in the SDP included in the SIP message received from the second user agent; and, when the SDP includes the media description field, determining the voice data format supportable by the second user agent from the information on the OS and the sound module included in a media specification description item in the media description field, comparing the determined voice data format of the second user agent with the voice data format supportable by the first user agent, and setting the format commonly supportable by both user agents as the processing format of voice data of both user agents.

Preferably, the step of setting the processing format of voice data includes the sub-steps of: determining whether the media description field is included in the SDP, and when the media description field is not included in the SDP, setting a default value as the processing format of voice data.

In accordance with another aspect of the present invention, there is provided a user agent for exchanging media information using a session initiation protocol (SIP), wherein the user agent generates, in a media specification description field of a session description protocol, (SDP), an SIP message including information on the OS and the sound module used, sends the generated SIP message to a counter user agent, receives the SDP of the SIP message sent by the counter user agent, determines a voice data format supportable by the counter user agent from the information on the OS and the sound module of the counter user agent included in the media specification description field in the received SDP, and sets the format commonly supportable by both the user agent and the counter user agent as the processing format of voice data for the user agent.

In accordance with still another aspect of the present invention, there is provided a communication network using a session initiation protocol (SIP), the network comprising: a first user agent for generating, in a media specification description field of a session description protocol (SDP), an SIP message including information on the OS and the sound module used by the first user agent, and for sending the generated SIP message to a second user agent so as to provide the second user agent with the information on the OS and the sound module of the first agent; and the second user agent determining a voice data format supportable by the first user agent from the information on the OS and the sound module of the first user agent as provided by the first user agent, comparing the determined format with the voice data format of the second user agent, and setting the format commonly supportable by both the first user agent and the second user agent as the processing format of voice data for the second user agent.

Preferably, the first user agent includes: an SIP message generating unit for generating the SIP message including, in the media specification description field of the SDP, the information on the OS and the sound module that the first user agent uses; and an SIP message originating unit for originating the SIP message inputted from the SIP message generating unit to the second user agent.

Preferably, the second user agent includes: an SIP message receiving unit for receiving the SIP message sent by the first user agent; and a determining unit for determining a processing format of voice data by determining a voice data format supportable by the second user agent from information on the OS and the sound module of the second user agent included in the media specification description field of the SIP message inputted from the SIP message receiving unit, comparing the determined format with a voice data format supportable by the first user agent, and setting the format commonly supportable by both the first user agent and the second user agent as a processing format of voice data of the first user agent.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the preferred embodiments of the present invention will be described in detail with reference to the drawings.

Figure 1:
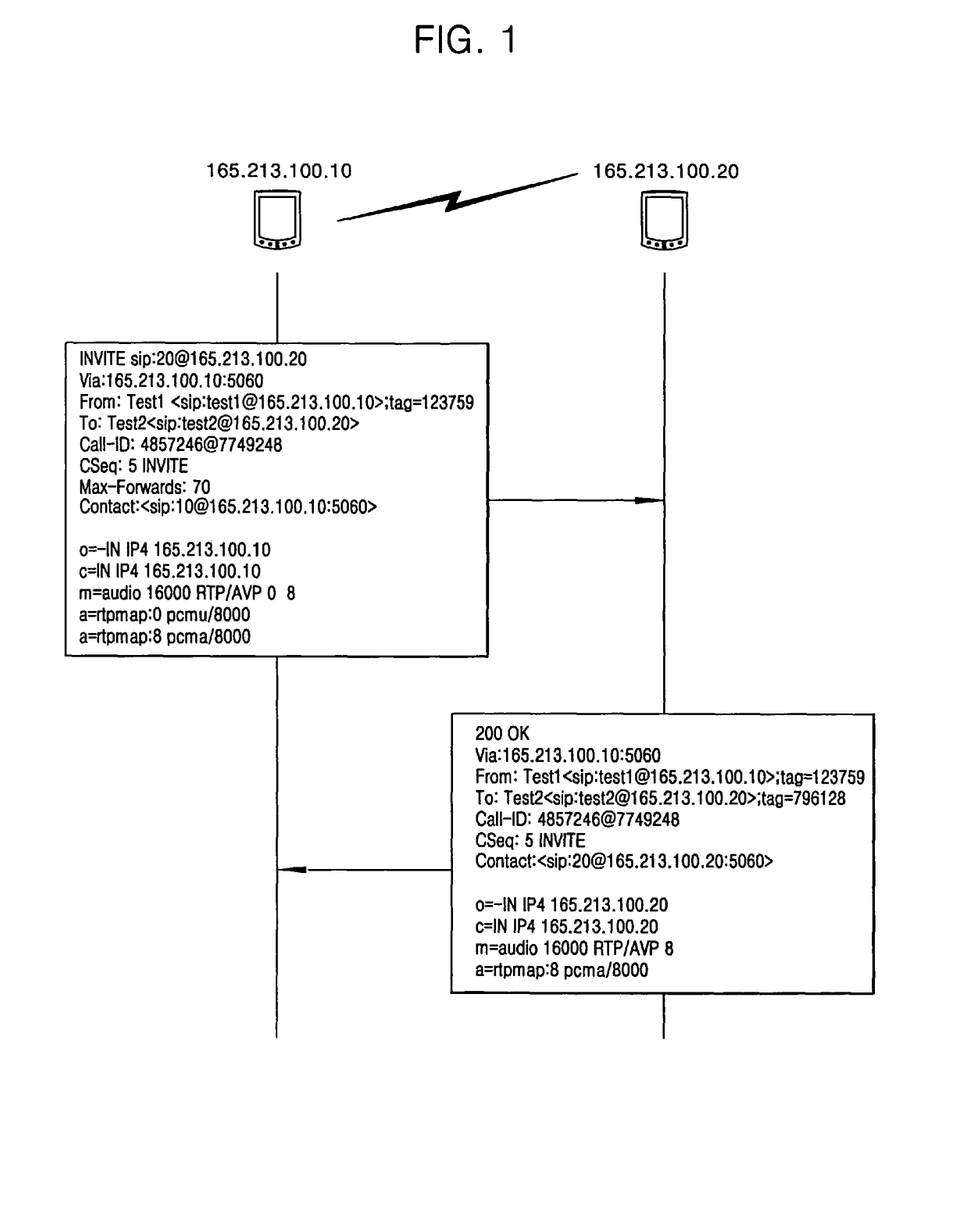
FIG. 1 is a diagram illustrating an example of SDP information in the process of SIP signaling.

FIG. 1 illustrates an example of SDP description during SIP signaling. As seen in FIG. 1, the SIP header includes 'To' and 'From' addresses similar to those in an E-mail message, together with an 'INVITE' command. Such an address is called a uniform resource identifier (URI). In a URI, a 'To' field may include a phone number. The SIP header also includes a 'call-ID' which is an eigenvalue identifying the SIP transaction. A 'Via' field indicates which IP address should be used to respond when negotiating with a user agent for an initial connection.

The SIP header included in a message originated by a user agent, as shown in FIG. 1, includes a 'Via' field and a 'Contact' field, indicating a message that is an invitation to a counter user agent with an IP of '165.213.100.20'. The SIP body transmitted by the originating user agent uses fields of 'o', 'c', 'm', 'a' and so on, and information in the fields includes session description established between the two user agents and media description of the originating user agent, as seen in Tables 1, 2 and 3.

The recipient user agent informs the originating user agent of its own media description through a transport message while sending the '200 OK' message in response to an 'INVITE' message from the originating user agent.

As seen from the foregoing, there is no item capable of describing SDP media description field sound module information according to the OS applied to a user agent. Consequently, it is impossible to process voice data in a format such as signed 16 little endian (S16_LE), signed 16 big endian (S16_BE), unsigned 16 little endian (U16_LE), and unsigned 16 big endian (U16_BE), which Linux defines, in addition to the available G.711 A-law/μ-law. For this reason, it has become necessary to provide a method for adding to the SDP information on a sound module and an OS of a user agent.

The present invention aims at providing an option which a user agent can use in voice communication between user agents through the addition of a new item to an SDP media description field. To this end, information on an OS, such as Linux, Win CE and so on, and information on a sound module, such as maestro3, i810_audio, ali5455, s3c24a0 and so on, is included in a media specification description ('d') field in an SDP media description field.

When the OS is Linux and the sound module is maestro3, a voice data format of G.711 A-law or signed 16 little endian (S16_LE) is supported. When the sound modules are i810_audio, ali5455 and s3c24a0, the voice data formats of S16_LE, G.711 A-law or S16_LE, and S16_LE, respectively, are supported.

In a user agent receiving corresponding information in which G.711 A-law/μ-law available through the information is used, the SDP media description field is as follows:
m=audio 16000 RTP/AVP 0 8
a=rtpmap:0 pcmu/8000
a=rtpmap:8 pcma/8000

When the OS is Linux (Kernel-2.4.20) and the sound module is maestro3 capable of processing G.711 A-law and S16_LE, the SDP media description field indicating that its sound module is maestro3, in addition to the information on the previously formatted G.711 A-law, is as follows:
m=audio 16000 RTP/AVP 8
a=rtpmap:8 pcma/8000
d=os:linux-2.4.20 sound:maestro3

In addition, when the OS is Linux (Kernel-2.4.20) and the sound module is s3c24a0 capable of processing S16_LE, the SDP media description field is as follows:
m=audio 16000 RTP/AVP
d=os:linux-2.4.20 sound:s3c24a0

In order to adapt the present invention, it must be possible to extract information on the voice data format that a counter user agent can process, through the information on the OS and the sound module obtainable using a newly defined item "d" of the SDP media description field.

When the OS is Linux, if voice packets are sent to a counter user agent by use of the sound module of maestro3, it should be possible for the counter user agent to support G.711 A-law or S16_LE. Also, when the sound module employs i810_audio, ali5455, and s3c24a0, respectively, it should be possible for the counter user agent to support S16_LE, G.711 A-law or S16_LE, and S16_LE, respectively.

Figure 2:
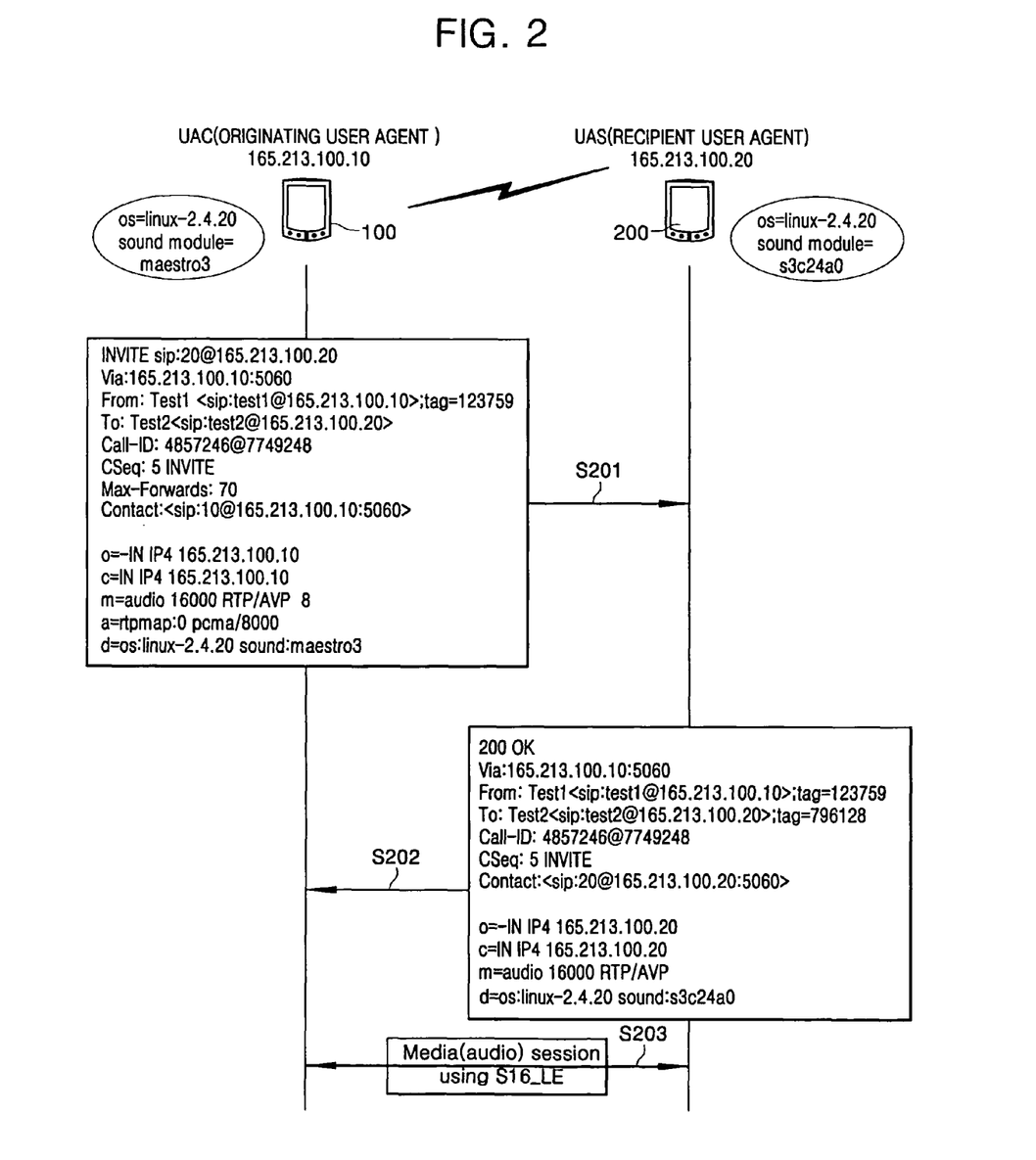
FIG. 2 is a diagram illustrating a preferred embodiment of a flow of SIP message exchange in the case of establishment of voice communication between user agents using different sound modules according to the present invention.

FIG. 2 is a diagram illustrating a preferred embodiment of a flow of SIP message exchange in the case of establishment of voice communication between user agents using different sound modules according to the present invention.

First, a user agent client (UAC) 100 trying to connect with another user agent sends a message of 'INVITE' to a user agent server (UAS) 200 (S201). The 'INVITE' message includes an SDP informing the UAS 200 of the media capabilities of the UAC 100.

If the invitation to the UAS 200 succeeds, a response message of '200' is sent to the originating UAC 100 which generated and sent the 'INVITE' message (S202). This means everything is all right and a session has been established. The '200' message also includes an SDP indicating the media capabilities supported.

The UAC 100 and UAS 200 determine information on the OS and the sound modules for each other through the exchange of the 'INVITE' message and the '200' message, and confirm a voice data format commonly supportable by both user agents with each other so as to establish a media session, and communication then starts in earnest (S203). In FIG. 2, it can be seen that 'S16_LE' was set as the voice data format commonly supportable by the two user agents (S203).

More specifically, the SIP message exchanged between the two user agents is as follows.

The originating user agent, i.e., UAC 100 in FIG. 2, has an IP address of 165.213.100.10, the OS is 'Linux (Kernel-2.4.20)', and the sound module used is 'maestro3'. The incoming user agent, i.e., UAS 200 in FIG. 2, has an IP address of 165.213.100.20, the OS is Linux (Kernel-2.4.20) as is the case with the originating user agent 100, and the sound module is 's3c24a0'.

The SIP message which the originating user agent UAC 100 sends to the recipient UAS 200, while loading on an "INVITE" packet, includes an SIP header and an SIP body.

The SIP header has fields such as "To", "From", "Contact", "Via" and so on, wherein "To" includes a destination user agent or an endpoint uniform resource identifier (URI), "From" includes a display name and a URI of the user agent sending a request, "Contact" includes information required for the connection of the destination user agent to the requesting user agent after call establishment, and "Via" includes a sending protocol and an SIP version to be used, as well as an IP address guaranteeing that the sender will receive a response to the request. Upon calling, the respective proxy server inserts its IP address into the "Via" field so as to allow the response to be sent therethrough.

In FIG. 2, the header of the SIP message which the UAC 100 sends includes an "INVITE" command, a "Via" field and a "Contact" field.

Next, looking at the body of the SIP which the UAC 100 sends, it includes an "o" field indicating information on the session identifier, a session description such as a "c" field and the like indicating connection information, an "m" field indicating information on a media name and a transport address, and an "a" field indicating media characteristic information. Looking only at the "m" and "a" fields, the following is indicated.

m=audio 16000 RTP/AVP 8
a=rtpmap:8 pcma/8000

The above message means that the UAC 100 can process voice data using G.711 A-law.

In addition to this base information, a "d" field may be added to FIG. 2, and that field includes information on the OS and the sound module that is added by the present invention. The "d" field of the SDP that the UAC 100 of FIG. 2 sends is indicated as follows:

d=os:linux-2.4.20 sound:maestro3

The above message means that the UAC 100 uses an OS of Linux-2.4.20 and a sound module of maestro3, and that it can process voice data using G.711 A-law and S16_LE.

Meanwhile, the UAS 200 which has received an 'INVITE' message from UAC 100 sends information on the UAS 200 to the UAC 100 while loading the information on the SDP body of a '200 OK' packet. When the OS is Linux (kernel-2.4.20) and the sound module is s3c24a0, the UAS 200 can process S16_LE, which is expressed as follows:

m=audio 16000 RTP/AVP
d=os:linux-2.4.20 sound:s3c24a0

The originating UAC 100 determines information on the OS and the sound module of the counter user agent (here, UAS 200) through an analysis of the SDP media description field so that it selects S16_LE as a commonly supportable format, and the recipient user agent UAS 200 also determines information on the OS and the sound module of the user agent UAC 100, so that it selects S16_LE as a commonly supportable voice data format.

Figure 3:
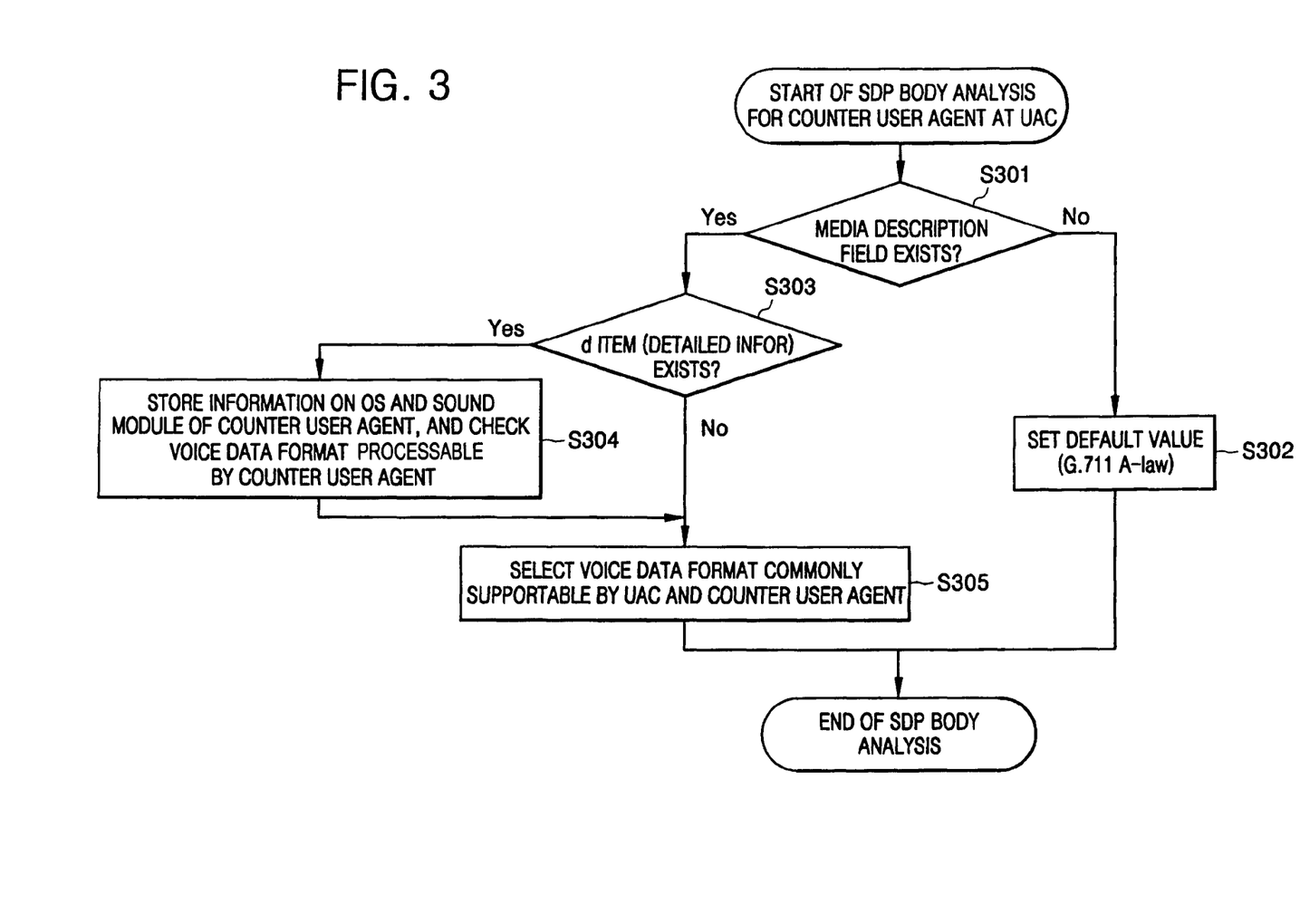
FIG. 3 is a flowchart of an SDP body analysis procedure conducted by an originating user agent with respect to a counter user agent according to the present invention.

FIG. 3 is a flowchart of an SDP body analysis procedure conducted by an originating user agent with respect to a counter user agent according to the present invention.

The originating user agent (UAC), which has received an SIP message from the counter user agent, determines whether a media description field exists in an SDP included in the SIP message (S301). The SIP message which the originating user agent receives from the recipient user agent may be a '200 OK' message. If the media description field does not exist in the SDP of the received SIP message, voice data is processed by setting a default value of G.711 A-law as the present voice coding method of the wireless user agent (S302).

If the media description field is included in the received SDP, a process is conducted to determine again whether an item of media specification description ("d" field) is included in the media description field (S303). If it is included therein, it means that the item of media specification description according to the present invention includes information on the OS and the sound module of the counter user agent. In this case, a process is conducted to store the information on the OS and the sound module of the counter user agent, and to determine a voice data format supportable by the counter user agent from the stored information (S304).

In addition, a process is conducted to determine a voice data format supportable by the originating user agent from its own OS and the sound module of the originating user agent, and to compare the checked format with the voice data format supportable by the counter user agent, so as to select a voice data format commonly supportable by both user agents (S305).

When the counter user agent has an OS of Linux and a sound module of s3c24a0, as was assumed in FIG. 2, the voice data format supportable by the counter user agent is S16_LE. When the originating user agent has an OS of Linux and a sound module of maestro3, the originating user agent can process voice data in a format of G.711 A-law or S16_LE.

Then, since the commonly supportable voice data format by both user agents is S16_LE, the originating user agent sets S16_LE as the voice data format for voice data that it sends to the counter user agent, thereby processing voice data.

Figure 4:
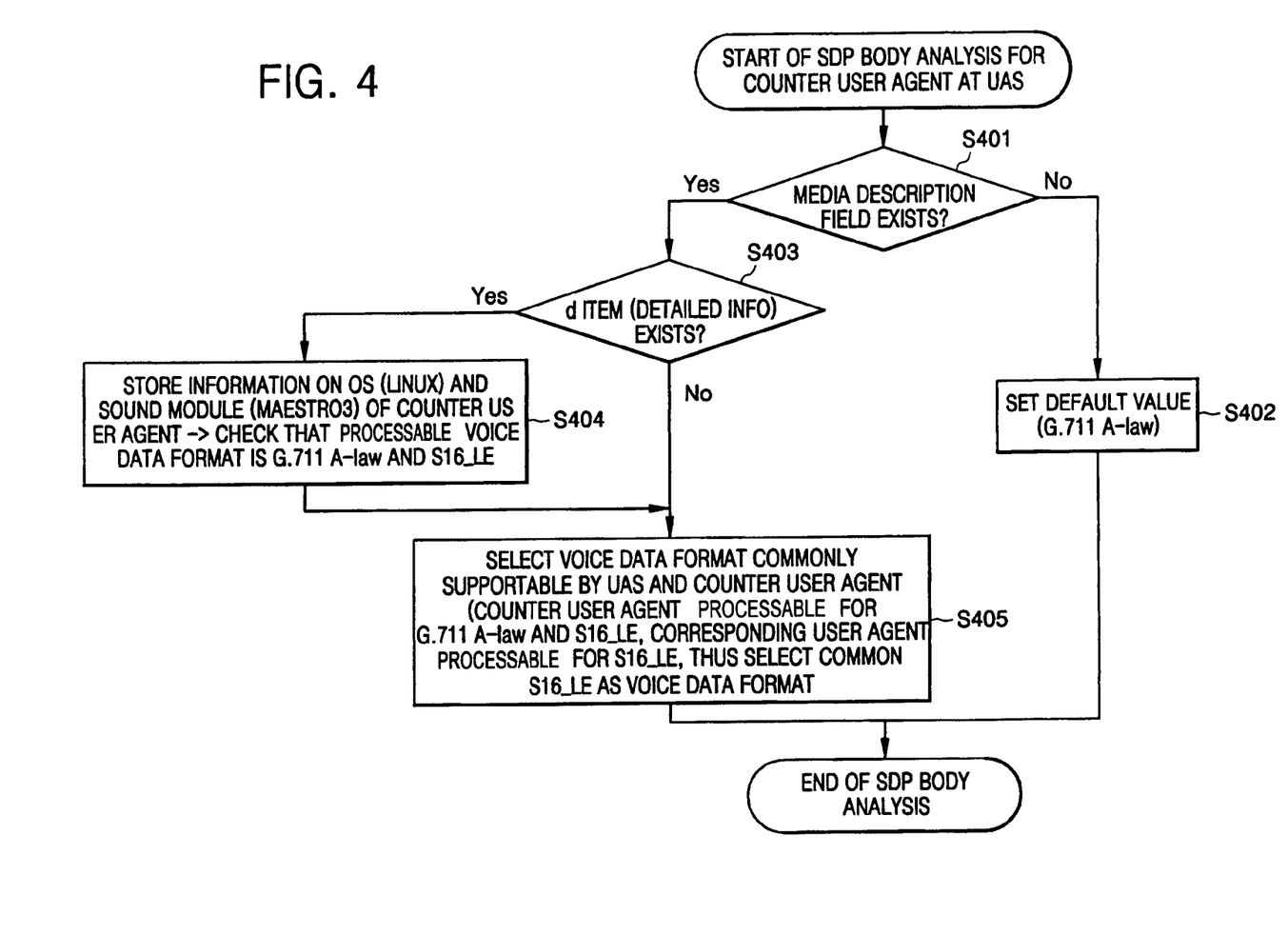
FIG. 4 is a flowchart of an SDP body analysis procedure conducted by a recipient user agent with respect to a counter user agent according to the present invention.

FIG. 4 is a flowchart of an SDP body analysis procedure conducted by a recipient user agent with respect to a counter user agent according to the present invention.

The analysis procedure conducted by the recipient user agent with respect to the SDP body of the counter user agent is the same case as that of the originating user agent shown in FIG. 3, so that the same procedure may be generally conducted. The flow chart of FIG. 4 merely explains a more specific example in comparison with the general case of FIG. 3.

The recipient (UAS), which has received an SIP 'INVITE' message from the originating counter user agent (UAC), determines whether a media description field exists in the SDP included in the SIP message (S401). If the media description field does not exist in the received SDP, voice data is processed by setting a default value of G.711 A-law as the present voice coding method of the wireless user agent (S402).

If the media description field is included in the received SDP, a process is conducted to determine again whether an item of media specification description ("d" field) is included in the media description field (S403). If it is included therein, a process is conducted to store the information on the OS and the sound module of the counter user agent (UAC), and to determine a voice data format supportable by the counter user agent from the stored information (S404). Since the embodiment of FIG. 4 assumes that the counter user agent (UAC) has an OS of Linux and a sound module of maestro3, the voice data format which can be processed is G.711 A-law or S16_LE.

The voice data format for the counter user agent has been determined, so that a process should be conducted to determine audio data type information for the counter user agent and to determine and compare a voice data format which can be processed by the recipient user agent (UAS), and then to select a format which can be processed by both user agents (S405). When the recipient user agent (UAS) has an OS of Linux and a sound module of s3c24a0 as was the case in FIG. 2, the voice format which can be processed by the recipient user agent (UAS) is S16_LE. A voice data format which can be processed by the respective user agents has been determined, so that a process should be conducted to select a format which can be processed by both user agents. In this case, both user agents can commonly process voice format S16_LE, and thus S16_LE is commonly set as the voice data format used in a media session established between the user agents.

Figure 5:
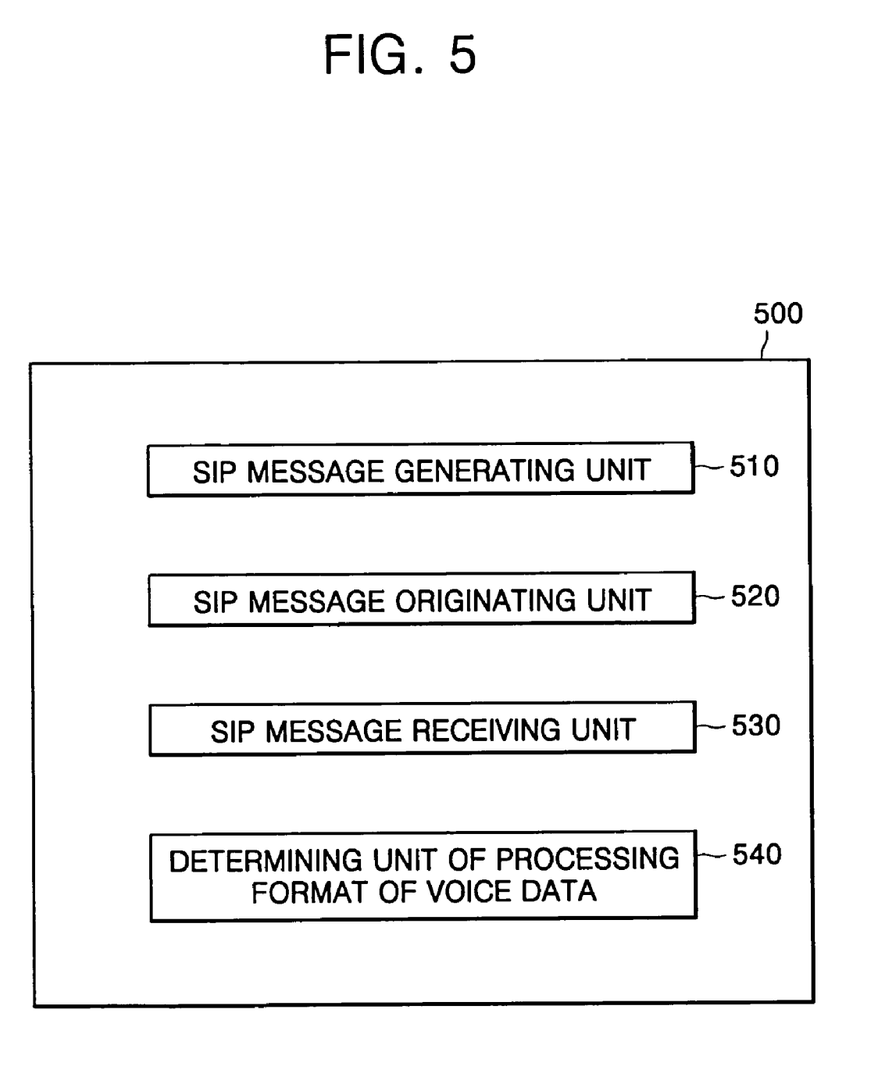
FIG. 5 is a block diagram of a user agent exchanging media description using an SIP according to the present invention.

FIG. 5 is a block diagram of a user agent exchanging media description using an SIP according to the present invention.

The user agent 500 according to the present invention generally comprises an SIP message generating unit 510, an SIP message originating unit 520, an SIP message receiving unit 530, and a processing format determining unit for voice data 540.

The SIP message generating unit 510 generates an SIP message rendering information on the OS and the sound module that the user agent 500 uses included in a media specification description field of the SDP. The SIP message may be an 'INVITE' message or a '200 OK' message, depending upon whether the user agent 500 is a user agent client or a user agent server.

The SIP message generated by the SIP message generating unit 510 is transmitted to a counter user agent communicating with the user agent 500 through the SIP message originating unit 520. The SIP message receiving unit 530 of the user agent 500 receives the SIP message transmitted by the counter user agent and provides it to the processing format determining unit 540 for voice data.

The processing format determining unit 540 for voice data has the functions of determining a voice data format supportable by the counter user agent from the information on the OS and the sound module of the counter user agent, comparing it with a voice data format supportable by the user agent 500, and setting a format commonly supportable by both the user agent 500 and the counter user agent as a processing format for voice data.

Since the user agent 500 can originate the SIP message or receive the SIP message, it should have both the SIP originating unit 520 and the SIP receiving unit 530. If the user agent 500 originates the SIP message, the SIP message generating unit 510 and the SIP message originating unit 520 perform main functions. If the user agent 500 receives the SIP message from another user agent and analyzes it, the SIP message receiving unit 530 and the processing format determining unit 540 for voice data play an important role.

As seen from the foregoing, the present invention provides a method for a media description exchange between user agents communicating with each other using an SIP, which can support another voice data format in addition to an existing available G.711 A-law/µ-law, thus providing an advantage in that even a user agent processing voice data in formats such as S16_LE, S16_BE, U16_LE and U16_BE can conduct voice communication with other user agent.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and scope of the appended claims.

What is claimed is:

1. A method for exchanging media description information between user agents using a session initiation protocol (SIP), the method comprising:

providing information on an operating system (OS) and a sound module, which is defined by the OS, of a first user agent so that the first user agent generates an SIP message comprising, in a media description field of a session description protocol (SDP), the information on the OS and the sound module of the first user agent, and the first user agent sends the SIP message to a second user agent; and setting a processing format for voice data of the second user agent by the second user agent determining a voice data format supportable by the first user agent from the information on the OS and the sound module of the first user agent in the SIP message sent by the first user agent, comparing the voice data format supportable by the first user agent with the processing format for voice data of the second user agent, and setting a format commonly supportable by the first user agent and the second user agent as the processing format for voice data of the second user agent.

2. The method according to claim 1, wherein setting the processing format for voice data of the second user agent comprises:

when the second user agent is a recipient user agent, determining whether the media description field is included in an SDP included in an INVITE message received from the first user agent; and when the SDP comprises the media description field, determining the voice data format supportable by an originating user agent from the information on the OS and the sound module included in a media specification description item in the media description field, comparing the determined voice data format supportable by the originating user agent with the format for voice data of the recipient user agent, and setting the format commonly supportable by both user agents as the processing format for voice data of the originating user agent and the recipient user agent.

3. The method according to claim 2, wherein, when the media description field is not included in the SDP, a default value is set as the processing format for voice data.

4. The method according to claim 3, wherein the default value is G.711 A-law.

5. The method according to claim 1, wherein setting the processing format for voice data of the second user agent comprises:

when the second user agent is an originating user agent, determining whether the media description field is included in an SDP included in a response message received from the first user agent; and when the SDP includes the media description field, determining the voice data format supportable by a recipient user agent from the information on the OS and the sound module included in a media specification description item in the media description field, comparing the determined voice data format of the recipient user agent with the voice data format supportable by the originating user agent, and setting the format commonly supportable by both user agents as the processing format for voice data of the originating user agent and the recipient user agent.

6. The method according to claim 5, wherein, when the media description field is not included in the SDP, a default value is set as the processing format for voice data.

7. The method according to claim 6, wherein the default value is G.711 A-law.

8. The method according to claim 1, wherein the OS of the first user agent comprises at least one of Linux and Win CE.

9. The method according to claim 1, wherein the sound module of the first user agent comprises at least one of maestro3, i810_audio, ali5455, and s3c24a0.

10. The method according to claim 1, wherein the voice data format supportable by the first user agent comprises at least one of G.711 A-law/µ-law and signed 16 little endian (S16_LE).

11. A method for exchanging media information between user agents using a session initiation protocol (SIP), the method comprising:
generating, at a user agent, an SIP message comprising information on an operating system (OS) and a sound module, which is defined by the OS, of the user agent in a media specification description field of a session description protocol (SDP); and
sending the generated SIP message to a counter user agent communicating with the user agent so that the user agent provides the counter user agent with the information on the OS and the sound module of the user agent.

12. A method for exchanging media information between user agents using a session initiation protocol (SIP), the method comprising:
receiving, at a user agent, a session description protocol (SDP) of a session initiation protocol (SIP) message sent by a counter user agent;
determining a voice data format supportable by the counter user agent from information on an operating system (OS) and a sound module, which is defined by the OS, of the counter user agent included in a media description field in the SDP; and
setting a format commonly supportable by the user agent and the counter user agent as a processing format for voice data of the user agent.

13. The method according to claim 12, wherein determining the voice data format supportable by the counter user agent comprises:
when the user agent is a recipient user agent, determining whether the media description field is included in an SDP included in an INVITE message received from the counter user agent; and
when the SDP comprises the media description field, determining a voice data format supportable by an originating user agent from the information on the OS and the sound module included in a media specification description item in the media description field, and setting the format commonly supportable by the user agent and the counter user agent as the processing format for voice data of the user agent, and when the media description field is not included in the SDP, setting a default value as the processing format for voice data of the user agent.

14. The method according to claim 13, wherein the default value is G.711 A-law.

15. The method according to claim 12, wherein determining the voice data format supportable by the counter user agent comprises:
when the user agent is an originating user agent, determining whether the media description field is included in an SDP included in a response message received from the counter user agent; and
when the SDP comprises the media description field, determining the voice data format supportable by the originating user agent from the information on the OS and the sound module included in a media specification description item in the media description field, and setting the format commonly supportable by both the user agent and the counter user agent as the processing format for voice data of the user agent, and when the media description field is not included in the SDP, setting a default value as the processing format for voice data of the user agent.

16. The method according to claim 15, wherein the default value is G.711 A-law.

17. A method for exchanging media information between user agents using a session initiation protocol (SIP), the method comprising:
generating a first SIP message comprising information on an operating system (OS) and a sound module, which is defined by the OS, of a user agent in a media description field of a session description protocol (SDP), and sending the first SIP message to a counter user agent so as to exchange the information on the OS and the sound module between the user agent and the counter user agent;
determining whether the media description field is included in an SDP included in a second SIP message received from the counter user agent; and
when the SDP included in the second SIP message comprises the media description field, determining a voice data format supportable by the counter user agent from the information on the OS and the sound module included in a media specification description item in the media description field of the SDP included in the second SIP message, comparing the determined voice data format supportable by the counter user agent with a voice data format supportable by the user agent, and setting a format commonly supportable by the user agent and the counter user agent as a processing format for voice data of the user agent and the counter user agent.

18. The method according to claim 17, wherein, when the media description field is not included in the SDP included in the second SIP message, a default value is set as the processing format for voice data of the user agent and the counter user agent.

19. A user agent for exchanging media information with a counter user agent using a session initiation protocol (SIP), said user agent comprising:
an SIP message generating unit to generate an SIP message comprising, in a media specification description field of a session description protocol (SDP), information on an operating system (OS) and a sound module, which is defined by the OS, used;
an SIP message originating unit to send the generated SIP message to the counter user agent;
an SIP message receiving unit to receive an SDP of an SIP message sent by the counter user agent; and
a processing format determining unit to determine a voice data format supportable by the counter user agent from information on an OS and a sound module of the counter user agent included in a media specification description field in the received SDP, and to set a format commonly supportable by both the user agent and the counter user agent as a processing format for voice data of the user agent.

20. A communication network using a session initiation protocol (SIP) between elements, the network comprising:
a first user agent; and
a second user agent, wherein the first user agent is configured to generate an SIP message comprising, in a media specification description field of a session description protocol (SDP), information on an operating system (OS) and a sound module, which is defined by the OS, of the first user agent, and to send the generated SIP message to the second user agent; and wherein the second user agent is configured to determine a voice data format supportable by the first user agent from the information on the OS and the sound module of the first user agent included in the SIP message generated and sent by the first user agent, to compare the determined voice data format with a voice data format of the second user agent, and to set a format commonly supportable by both the first user agent and the second user agent as a processing format for voice data of the second user agent.

21. The communication network according to claim 20, wherein the first user agent comprises:

an SIP message generating unit to generate the SIP message comprising, in the media specification description field of the SDP, the information on the OS and the sound module of the first user agent; and an SIP message sending unit to send the SIP message generated by the SIP message generating unit to the second user agent.

22. The communication network according to claim 20, wherein the second user agent comprises:

an SIP message receiving unit to receive the SIP message sent by the first user agent; and a determining unit to determine the voice data format supportable by the first user agent from the information on the OS and the sound module of the first user agent included in the media specification description field of the SIP message sent by the first user agent and inputted from the SIP message receiving unit, to compare the determined voice data format with the voice data format supportable by the second user agent, and to set the format commonly supportable by both the first user agent and the second user agent as a processing format for voice data of the second user agent.

* * * * *